(12) United States Patent
Sgarabottolo

(10) Patent No.: US 9,387,994 B2
(45) Date of Patent: Jul. 12, 2016

(54) MACHINE FOR CUTTING FLAT GLASS SHEETS

(75) Inventor: Silvano Sgarabottolo, Foshan (CN)

(73) Assignee: Newtech-Engineering S.r.l., Thiene (Vicenza) (IT)

( * ) Notice: Subject to any disclaimer, the term of this patent is extended or adjusted under 35 U.S.C. 154(b) by 1080 days.

(21) Appl. No.: 13/504,201

(22) PCT Filed: Oct. 27, 2010

(86) PCT No.: PCT/EP2010/066242
§ 371 (c)(1),
(2), (4) Date: Apr. 26, 2012

(87) PCT Pub. No.: WO2011/051326
PCT Pub. Date: May 5, 2011

(65) Prior Publication Data
US 2012/0204697 A1    Aug. 16, 2012

(30) Foreign Application Priority Data
Oct. 28, 2009    (IT) ............... PD2009A0317

(51) Int. Cl.
*B65G 49/06* (2006.01)
*C03B 33/03* (2006.01)
(Continued)

(52) U.S. Cl.
CPC ............ *B65G 49/067* (2013.01); *B65G 49/068* (2013.01); *C03B 33/03* (2013.01); *C03B 33/078* (2013.01); *Y10T 83/6656* (2015.04)

(58) Field of Classification Search
CPC ...... C03B 33/03; C03B 33/02; C03B 33/023; Y10T 83/2198; Y10T 83/658; Y10T 83/6667; B65G 49/06; B65G 49/067; B65G 49/068; B25B 11/02; B25B 5/085; B25B 19/04; B23Q 3/06
USPC .................. 414/778, 416.07; 108/7
See application file for complete search history.

(56) References Cited

U.S. PATENT DOCUMENTS 640,458 A * 1/1900 Farr ................................. 83/156
1,983,769 A * 12/1934 Owen ............................. 198/409
(Continued)

FOREIGN PATENT DOCUMENTS

EP    0673890 A1    9/1995
EP    1609767 A2    12/2005
(Continued)

OTHER PUBLICATIONS

International Search Report; International Application No. PCT/EP2010/066242; International Filing Date Oct. 27, 2010; Mail Date Dec. 21, 2010.
(Continued)

*Primary Examiner* — Stephen Choi
*Assistant Examiner* — Evan MacFarlane
(74) *Attorney, Agent, or Firm* — Stolmar & Partner; Robert Lelkes

(57) ABSTRACT

A machine for cutting flat glass sheets has a fixed frame for supporting a worktable, which can be lifted, with rotation device, for loading and unloading sheets or sheet portions, and a movable bridge capable of performing a translational motion with respect to the worktable which supports a cutting head capable of moving on the bridge. The movable bridge slides on rails associated with a fixed frame and the rotation device for the liftable worktable has at least one lifting arm, which is fixed to the movable worktable and pivoted to the fixed frame, the lifting arm being contoured so as to extend around and not affect, during its rotation, the rails for the movable bridge, a portion of the rails extending so as to affect the region of rotation of the lifting arm.

4 Claims, 2 Drawing Sheets

(51) Int. Cl.
  *C03B 33/02* (2006.01)
  *C03B 33/023* (2006.01)
  *B26D 7/06* (2006.01)
  *C03B 33/07* (2006.01)

(56) References Cited

U.S. PATENT DOCUMENTS

| | | | | |
|---|---|---|---|---|
| 3,279,664 A | * | 10/1966 | Lynch | 225/96.5 |
| 3,668,955 A | * | 6/1972 | Rupprecht et al. | 83/879 |
| 3,787,040 A | * | 1/1974 | Allen | 269/58 |
| 4,863,340 A | * | 9/1989 | Masunaga et al. | 414/789.5 |
| 5,030,059 A | * | 7/1991 | Favre | 414/798.5 |
| 7,472,636 B2 | * | 1/2009 | Bavelloni | 83/879 |
| 2005/0217451 A1 | * | 10/2005 | Bavelloni | 83/651 |
| 2005/0279199 A1 | | 12/2005 | Bavelloni | |
| 2006/0137504 A1 | * | 6/2006 | Nishio et al. | 83/875 |
| 2006/0288838 A1 | * | 12/2006 | Lisec | 83/879 |
| 2007/0190898 A1 | * | 8/2007 | Mercure | 451/6 |

FOREIGN PATENT DOCUMENTS

| | | |
|---|---|---|
| FR | 1300659 A1 | 8/1962 |
| FR | 2545815 A1 | 11/1984 |

OTHER PUBLICATIONS

Written Opinion; International Application No. PCT/EP2010/066242; International Filing Date Oct. 27, 2010; Mail Date Dec. 21, 2010.

* cited by examiner

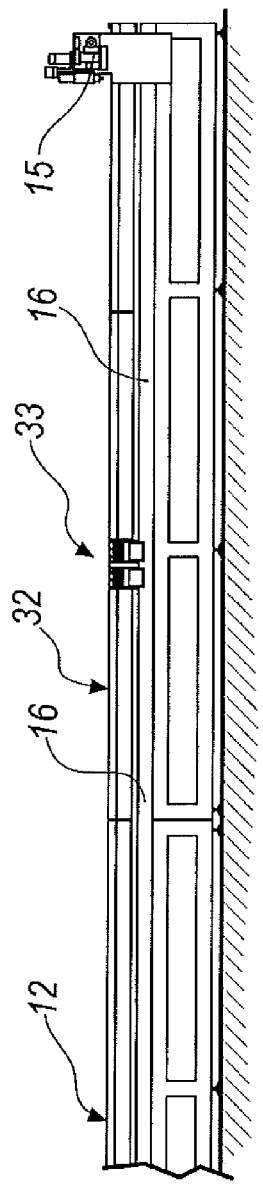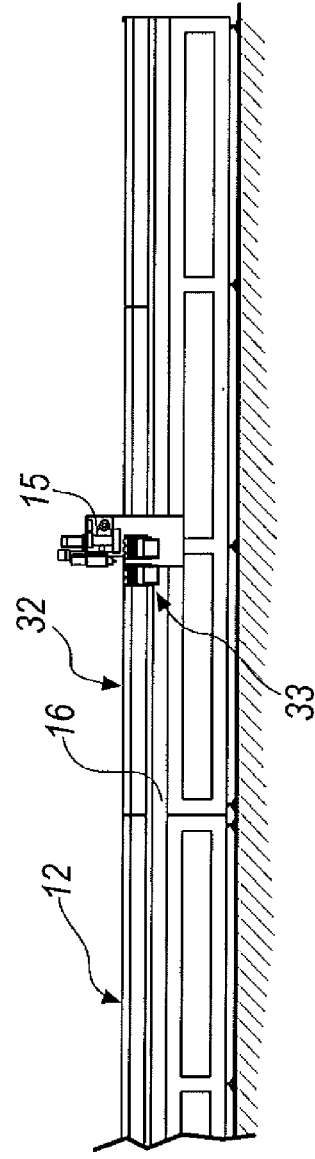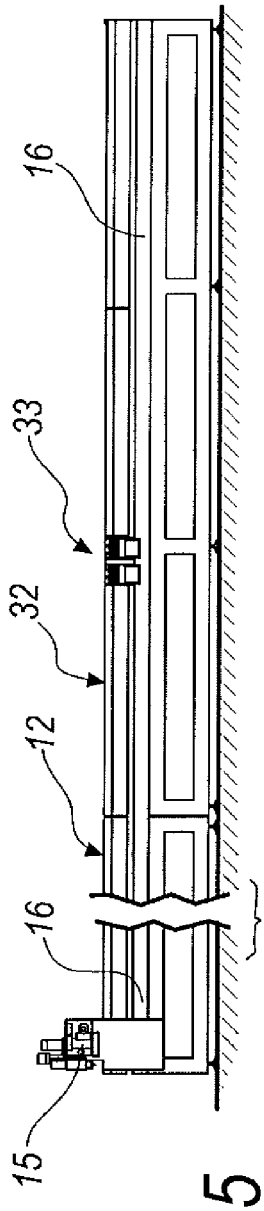

MACHINE FOR CUTTING FLAT GLASS SHEETS

TECHNICAL FIELD

The present invention relates to a machine for cutting flat glass sheets.

BRIEF DISCUSSION OF RELATED ART

Nowadays, machines for working on flat glass sheets can be divided into two types, a first type designed for cutting normal, i.e. non-laminated, flat glass, and a second type designed for cutting and cropping laminated glass.

Currently available on the market are what are known as "combined" machines, i.e. machines that comprise both cutting means for flat glass and cutting and cropping means for laminated glass. Although they are called "combined", in reality they are two paired substantially independent machines, one for cutting flat glass and one for cutting and cropping laminated glass, which are inserted into a production line and made to operate in combination.

All current machines for cutting sheets of laminated glass have substantially two cutting bridges, a first bridge, which can move, for cutting sheets of non-laminated glass, and a second bridge, which is fixed, which is paired with a cutting section underneath the glass.

Such "combined" machines of the known type generally have a movable bridge which is associated with a table for loading and working which can be rotated and inclined in order to load the sheets.

This movable bridge can therefore be moved only on the worktable to whose frame it is coupled.

BRIEF SUMMARY

The aim of the present invention is to devise a machine for cutting flat glass sheets, which is capable of overcoming the drawbacks of the above-mentioned known combined machines.

Within this aim, the invention devises a machine which is capable of performing both the cutting and the cropping, automatically, of a flat sheet of glass that is either non-laminated or laminated.

The invention further devises a machine which is more versatile than the so-called "combined" machines of known type, but which is at least as easy to manage to the standard of the known machines.

The invention also devises a machine with performance levels that are at least as good as those of the known machines, combined or not.

The invention provides a machine, the cutting area of which can be inspected completely, thus allowing optimal control by the operator, ease of evacuation of the cut pieces and cutting scraps, and ease of cleaning and maintenance of the cutting area and of all the mechanical elements engaged in cutting.

The invention further provides a machine for cutting flat glass sheets that is structurally simple and which can be made using known means and technologies, and at low cost.

More particularly, a machine is provided for cutting flat glass sheets, of the type comprising a fixed frame for supporting a worktable, which can be lifted, with rotation means, for loading and unloading sheets or sheet portions, and a movable bridge, which is designed to perform a translational motion with respect to said worktable and supports a cutting head, which can move on said bridge, said machine being characterized in that said movable bridge slides on rails which are associated with said fixed frame, said rotation means for said liftable worktable comprising at least one lifting arm, which is fixed to the movable worktable and is pivoted to the fixed frame, said lifting arm being contoured so as to extend around and not affect, during its rotation, said rails for the movable bridge, a portion of said rails extending so as to affect the region of rotation of said lifting arm.

BRIEF DESCRIPTION OF THE DRAWINGS

Further characteristics and advantages of the invention will become better apparent from the following detailed description of a preferred, but not exclusive, embodiment of the machine according to the invention, illustrated by way of non-limiting example in the accompanying drawings, wherein:

FIGS. 3, 4 and 5 each schematize a position of use of the machine according to the invention.

DETAILED DESCRIPTION

Figure 1:
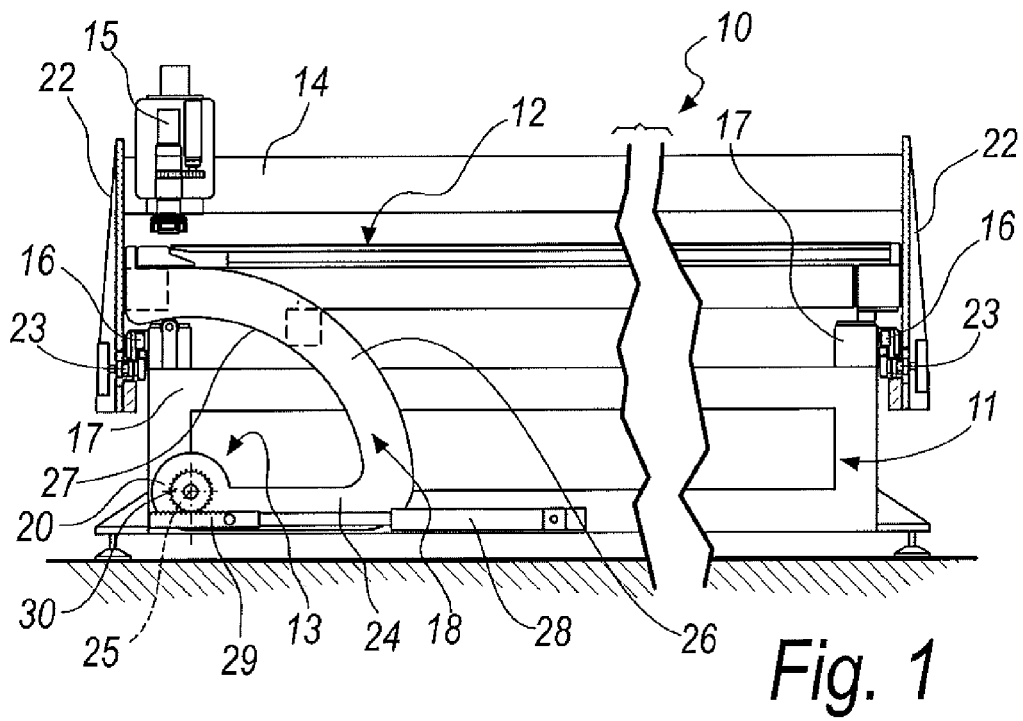
FIG. 1 is a partially sectional front elevation view of a machine according to the invention, in a first configuration of use.
Figure 2:
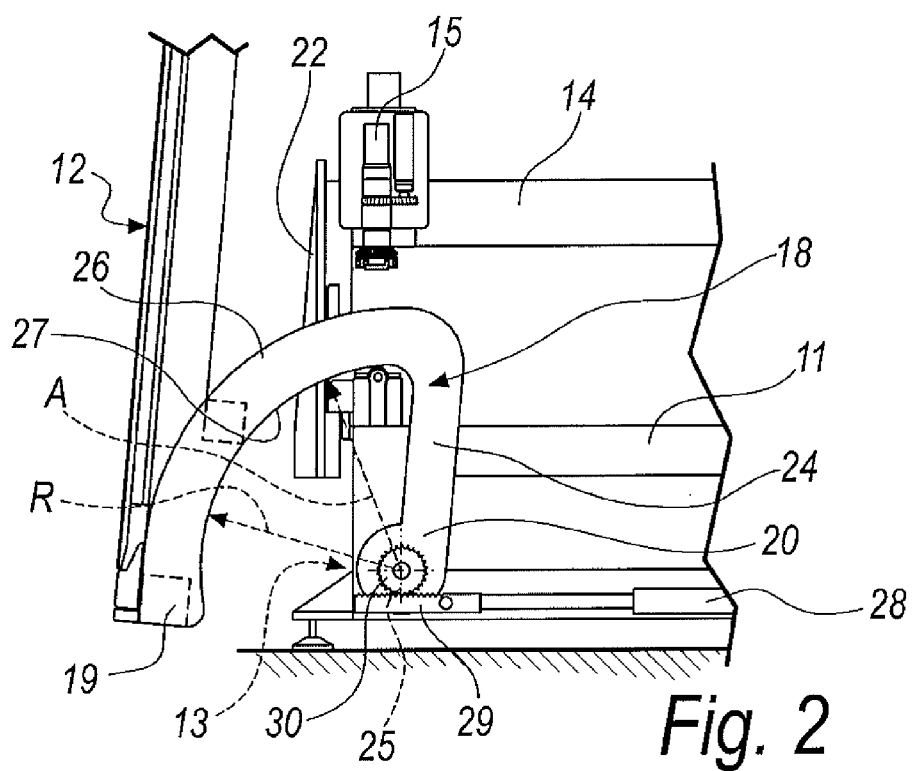
FIG. 2 is a partially sectional front elevation view of the machine of FIG. 1.

With reference to the figures, a machine for cutting flat glass sheets is generally designated by the reference numeral 10.

The machine 10 is of the type comprising a fixed frame 11 for supporting a worktable 12, which can be lifted, with rotation means 13, which are described hereinafter, for loading and unloading sheets or sheet portions, and a movable bridge 14, which is designed to perform a translational motion with respect to the worktable 12 and supports a cutting head 15, which can move on the bridge 14.

The distinctive feature of the machine 10 is constituted by the fact that the movable bridge 14 slides on rails 16 which are associated with the fixed frame 11, and which in particular are fixed to sides 17 of the fixed frame 11, and by the fact that the rotation means for the liftable worktable 12, comprise at least one lifting arm 18, which is fixed at a first end 19 to the worktable 12 while at the second and opposite end 20 it is pivoted to the fixed frame 11.

The lifting arm 18 is contoured so as to extend around and not affect, during its rotation, the rails 16 for the movable bridge 14, a portion of the rails 16 extending so as to affect the region of rotation of the lifting arm 18.

The bridge 14 is understood to comprise two abutments 22 with gears 23 and wheels to engage with the rails 16, which are understood to be of a per se known type.

In particular, in the embodiment of the invention described herein for the purposes of non-limiting example of the invention, the lifting arm 18 is made up substantially of two portions, a first portion 24 which is substantially rectilinear and extends in a radial direction with respect to the axis of rotation 25 of the arm 18, and a second portion 26 which is curved and has a lower edge 27, i.e. the edge that is nearer to the rail 16, which has a profile shaped like a circular arc with a radius R that is greater than the radial distance A between the axis of rotation 25 and the point of the rail 16 that lies furthest from the axis 25.

The rotation means 13 for the lifting arm 18 are constituted by a hydraulic actuator 28, which is arranged so as to act along a fixed direction, for example horizontally, and is designed to produce the translational motion of a rack 29, which in turn meshes with a pinion 30 which is jointly connected to the second end 20 of the arm 18 and has the same axis of rotation 25.

In this way the hydraulic actuator 28 operates in an optimal condition, with the stem being subjected only to loads of traction or thrust and not also of flexion as in known applications, in which the rotation of the actuator can be as much as between 35° and 40°.

The machine 10 according to the invention also comprises a second worktable 32 which is provided with a section 33 which operates upwards from below (and hence in the jargon is called "lower"), for cutting sheets of laminated glass from below.

The rails 16 extend continuously from the liftable worktable 12 to the second worktable 32.

In this way, thanks to the distinctive shape of the lifting arms 18, whether they be one or more in number, the bridge 14 can perform a translational motion from a position of rest, illustrated in FIG. 3, until it reaches the lower section 33, which is understood to be of a per se known type, to define a complete cutting and cropping device for sheets of laminated glass, as in FIG. 4.

The operations of the cutting head 15 and of the lower section 33 can be coordinated and synchronized by means of known electronic control units and special-purpose software.

In FIG. 5 the cutting head is shown operating on the liftable worktable 12.

In practice it has been found that the invention fully achieves the intended aim.

In particular, with the invention a machine has been devised which is capable of performing both the cutting and the cropping, automatically, of a flat sheet of glass that is either non-laminated or laminated.

This is made possible by the distinctive shape of the lifting arm 18, which enables the bridge 14 with the upper cutting head 15 to freely slide over the entire length of the machine 10, without the presence of the rails 16 preventing the worktable 12 that supports the sheets from being lifted in order to load the sheet or unload large pieces of glass.

Indeed, the curved lifting arm 18 makes it possible to lift the worktable 12 by rotating it around the sliding rail 16 of the bridge 14, thus allowing the use of a rail 16 which is continuous, i.e. without interruption for the entire length of the machine 10.

Moreover, with the invention a machine has been devised, whose hydraulic actuators 28 for moving the arm 18 operate in an optimal condition with the stems subjected only to loads of traction and thrust and not of flexion as in known machines.

Further, with the invention a machine has been devised which is more versatile than the so-called "combined" machines of known type, but which is at least as easy to manage to the standard of the known machines.

Moreover, with the invention a machine has been devised with performance levels that are at least as good as those of the known machines, combined or otherwise.

Moreover, with the invention a machine has been devised, the cutting area of which can be inspected completely, thus allowing optimal control by the operator, ease of evacuation of the cut pieces and cutting scraps, and ease of cleaning and maintenance of the cutting area and of all the mechanical elements engaged in cutting.

Moreover, with the present invention a machine for cutting flat glass sheets has been provided that is structurally simple and which can be made using known means and technologies, and at low cost.

The invention thus conceived is susceptible of numerous modifications and variations, all of which are within the scope of the appended claims. Moreover, all the details may be substituted by other, technically equivalent elements.

In practice the materials employed, as well as the dimensions and the contingent shapes, may be any according to requirements and to the state of the art.

The disclosures in Italian Patent Application No. PD2009A000317 from which this application claims priority are incorporated herein by reference.

The invention claimed is:

1. A machine for cutting flat glass sheets comprising
   a fixed frame for supporting a first work table, which can be lifted with a rotation device, for loading and unloading sheets or sheet portions,
   rails associated with the fixed frame, and
   a movable bridge slidably mounted on the rails for performing a translational motion with respect to said first work table, wherein the movable bridge supports a cutting head, which can move on said bridge,
   said rotation device comprising at least one lifting arm having a first end and a second end, wherein the first end of each lifting arm is affixed to the first work table and the second end of each lifting arm is pivotably connected to the fixed frame,
   wherein a portion of said rails intersects a plane of rotation of said lifting arm, said lifting arm is composed of two portions comprising:
   (a) a first portion comprising the second end of the lifting arm, which extends radially with respect to an axis of rotation of said lifting arm, and
   (b) a second portion comprising the first end of the lifting arm, which is curved and has a lower edge, wherein the lower edge has a curved profile having a radius greater than a radial distance between the axis of rotation and a point of the rail, wherein the point is one that lies furthest from the axis of rotation, and wherein the rail is one of the rails that lies closest to the axis of rotation.

2. The machine according to claim 1, wherein said rotation device further comprises a hydraulic actuator, a rack and a pinion, wherein the hydraulic actuator is engaged with the rack for providing a translational motion to the rack, the rack is engaged with the pinion for rotating the pinion in response to the translational motion of the rack, and the pinion is fixedly connected to the lifting arm and has a same axis of rotation as the lifting arm for rotating the lifting arm about the axis of rotation.

3. The machine according to claim 1 further comprising a second work table having a lower section for cutting sheets of laminated glass from below, said rails extending continuously from the first work table to said second work table.

4. The machine according to claim 3, wherein said movable bridge is adapted to perform a translational motion so as to reach the lower section of the second work table, so as to form a complete cutting and cropping device for sheets of laminated glass.

* * * * *